(12) United States Patent
Brindel et al.

(10) Patent No.: US 6,424,443 B1
(45) Date of Patent: Jul. 23, 2002

(54) OPTICAL SIGNAL RESYNCHRONIZATION METHOD AND DEVICE

(75) Inventors: Patrick Brindel, Longpont/Orge (FR); Thomas Ducellier, Ottawa (CA)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/245,334

(22) Filed: Feb. 5, 1999

(30) Foreign Application Priority Data

Feb. 12, 1998 (FR) ............................................. 98 01675

(51) Int. Cl.[7] ................................................ H04B 10/00
(52) U.S. Cl. ........................ 359/158; 359/110; 359/140; 359/181
(58) Field of Search ................................ 359/158, 181, 359/110, 140, 109–195

(56) References Cited

U.S. PATENT DOCUMENTS

| | | |
|---|---|---|
| 5,373,381 A | 12/1994 | Alfano et al. |
| 5,777,766 A * | 7/1998 | Fontana et al. ............. 359/158 |
| 5,781,326 A * | 7/1998 | Chiaroni et al. ............ 359/237 |

FOREIGN PATENT DOCUMENTS

| | | |
|---|---|---|
| EP | 0 619 658 A2 | 10/1994 |
| WO | WO 97/44929 | 11/1997 |

\* cited by examiner

*Primary Examiner*—Jason Chan
*Assistant Examiner*—Dzung Tran
(74) *Attorney, Agent, or Firm*—Sughrue Mion, PLLC

(57) ABSTRACT

To resynchronize input optical signals with different optical carrier frequencies f1, f2 a delayed optical signal is created by applying a variable time-delay to one of the signals. A combination signal is formed by coupling measurement optical signals respectively obtained from the delayed signal and from the other input signal. A mixed signal is formed by injecting the combination signal into a non-linear optical device. A filtered signal is formed from the mixed signal using a filter tuned to an optical frequency f3 equal to p.f1+q.f2, p and q being relative integers such that the frequency f3 is different to the frequencies f1 and f2 of the carrier waves. The variable time-delay is controlled in accordance with a control electrical signal representative of the average value of the intensity of the filtered signal. Applications include wavelength-division multiplex optical communication systems.

10 Claims, 3 Drawing Sheets

FIG_2
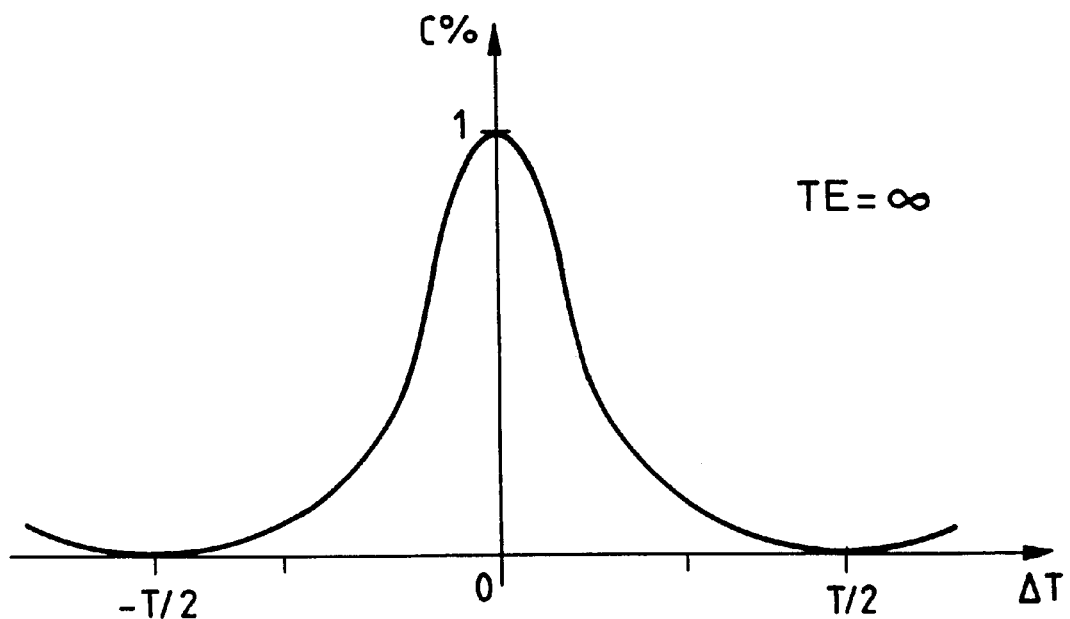
FIG_3
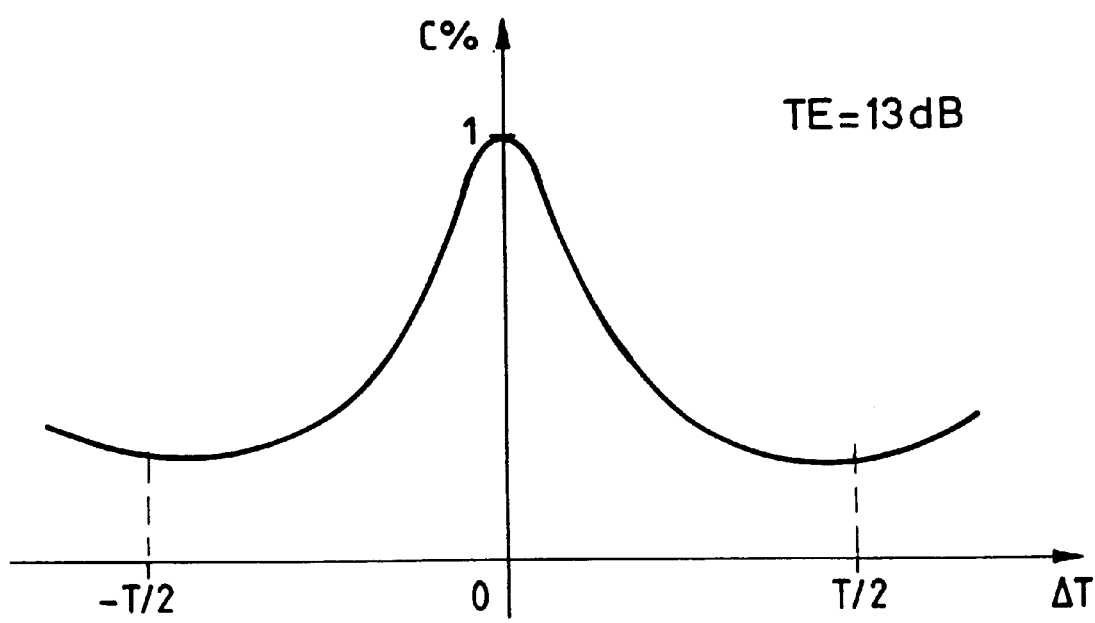

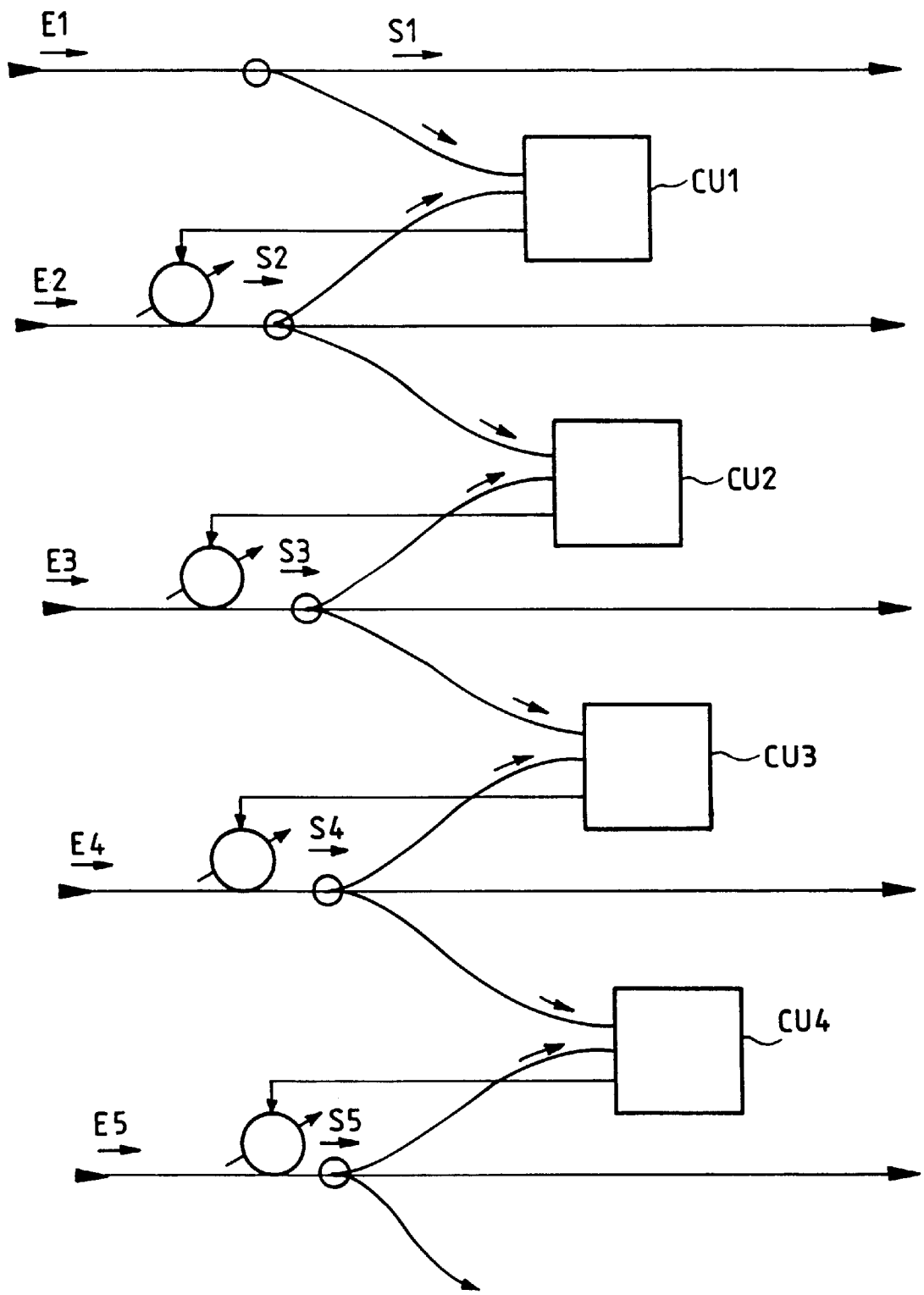

OPTICAL SIGNAL RESYNCHRONIZATION METHOD AND DEVICE

BACKGROUND OF THE INVENTION

1. Field of the Invention

The invention concerns telecommunication networks and more particularly optical communication systems in which optical digital data is transmitted, routed and processed.

2. Description of the Prior Art

The information conveyed in such systems is usually binary data in the form of pulses timed at a particular modulation clock frequency. The amplitudes of the pulses represent the binary data. The pulses are initially in electrical form and are then converted into an optical signal by modulating the intensity (optical power) of an optical carrier.

Multiplexing techniques such as time-division multiplexing and/or wavelength-division multiplexing are used in order for the system to be able to convey a large number of optical signals exploiting the bandwidth of optical links.

In most optical communication systems using more than one wavelength it is generally desirable, at some points in the network at least, for more than one optical signal to have intensity modulation conforming to strictly defined phase relationships (to the nearest $2\pi$).

This problem arises at nodes where a plurality of optical signals with different wavelengths from independent sources have to be perfectly synchronized before they are combined to form a wavelength-division multiplex, for example.

A similar problem arises in simultaneously regenerating streams of wavelength-division multiplexed solitons using a modulator. The streams of solitons must be resynchronized before they are fed into the modulator, which is controlled by a clock signal synchronized with those of the streams of solitons.

Another example is that of time-division multiplexing interfaces where a plurality of optical signals are interleaved temporally before they are combined to form the time-division multiplex.

One feasible solution is to recover the clocks associated with the various signals to be synchronized, comparing their phases and applying time-delays to the signals in accordance with the comparison results. However, this solution has the drawback of necessitating clock recovery more than once.

Accordingly, one aim of the invention is to propose a solution to the synchronization problem that avoids the aforementioned drawback. Another aim is to enable implementation not only of the optical part but also of the associated electronic circuits.

SUMMARY OF THE INVENTION

To be more precise, the invention consists in a method of resynchronizing optical signals in which a variable time-delay is applied to a first or a second input optical signal to supply a delayed optical signal phase-locked relative to the other input optical signal, said first and second input optical signals conveying information by intensity modulation of optical carrier waves having different optical frequencies f1 and f2, said method being characterized in that it consists in:

forming first and second measurement optical signals respectively representative of said delayed optical signal and said other input optical signal, forming a combination signal by coupling said first and second measurement optical signals, forming a mixed signal by injecting said combination signal into a non-linear optical device, forming a filtered signal by filtering said mixed signal using a filter tuned to an optical frequency f3 equal to p.f1+q.f2, p and q being relative integers such that the frequency f3 is different from the frequencies f1 and f2 of the carrier waves, forming a control electrical signal representative of the average value of the intensity of said filter signal, and controlling said variable time-delay in accordance with said control signal.

Accordingly, the method exploits the property of non-linear optical media whereby intermodulation phenomena occur if two optical signals with different carrier frequencies f1, f2 are fed into the medium, for example. The medium then generates intermodulation signals at optical frequencies in the form p.f1+q.f2, where p and q are generally relative integers that of course make the preceding expression positive. The amplitude of the modulation of each signal is in particular representative of the difference between the phases of the signals. Experiments have shown that the average value of the intensity of a selected intermodulation signal is a good representation of the phase difference.

The method is executed partly in the optical domain and partly in the electrical domain, with the advantage that the processing in the electrical domain does not require any circuit operating at a high frequency, which considerably simplifies implementation.

The method as defined hereinabove can also be used to resynchronize more than two signals. For example, it is sufficient to apply the method to first two signals, which supplies two resynchronized output signals, and then to apply the method again to a third signal and to one of the first two resynchronized output signals, and so on.

In a preferred embodiment, said numbers p and q are such that the difference between said frequency f3 of the filter and one of the frequencies f1 or f2 of the carrier waves is equal to the difference between said carrier wave frequencies f1 and f2.

This assures that the frequency f3 is close to the frequencies f1 and f2, i.e. is in the usual range of optical transmission frequencies. Accordingly the optical components processing the mixed signal (filter, photodetector) can be of conventional types.

In accordance with another aspect of the invention, the method is further characterized in that said first and second measurement optical signals are respectively sampled from said delayed optical signal and from said other input optical signal and in that said combination signal is amplified optically before it is injected into a non-linear optical medium.

In accordance with another aspect of the invention said electrical control signal is obtained by electrical low-pass filtering of a converted signal supplied by a photodetector to which said filtered signal is applied.

The invention also consists in a device for resynchronizing optical signals for implementing the method defined hereinabove. The resynchronization device includes a variable time-delay device adapted to receive a first or a second input optical signal and adapted to supply a delayed optical signal phase-locked relative to the other input optical signal, said first and second input optical signals conveying information by modulating the intensity of optical carrier waves having different optical frequencies f1 and f2. The device is characterized in that it comprises:

sampling means for forming first and second measurement optical signals respectively representative of said delayed optical signal and said other input optical signal, coupling means adapted to receive said first and second measurement optical signals and adapted to supply a combination signal, a non-linear optical device adapted to receive said combination signal and adapted to supply a mixed signal, a filter adapted to receive said mixed signal and adapted to supply a filtered signal, said filter being tuned to an optical frequency f3 equal to p.f1+q.f2, p and q being relative integers such that the frequency f3 is different from the frequencies f1 and f2 of the carrier waves, a converter device for forming a control electrical signal representative of the average value of the intensity of said filtered signal, and control means for controlling said variable time-delay device in accordance with said control signal.

Other aspects and advantages of the invention will become apparent in the remainder of the description with reference to the figures.

BRIEF DESCRIPTION OF THE DRAWINGS

FIGS. 2 and 3 are curves showing relative variations of the control signal as a function of the difference between the phases of the optical signals.

FIG. 4 shows a circuit for resynchronizing more than two optical signals using the device in accordance with the invention.

DETAILED DESCRIPTION OF THE PREFERRED EMBODIMENT

Figure 1:
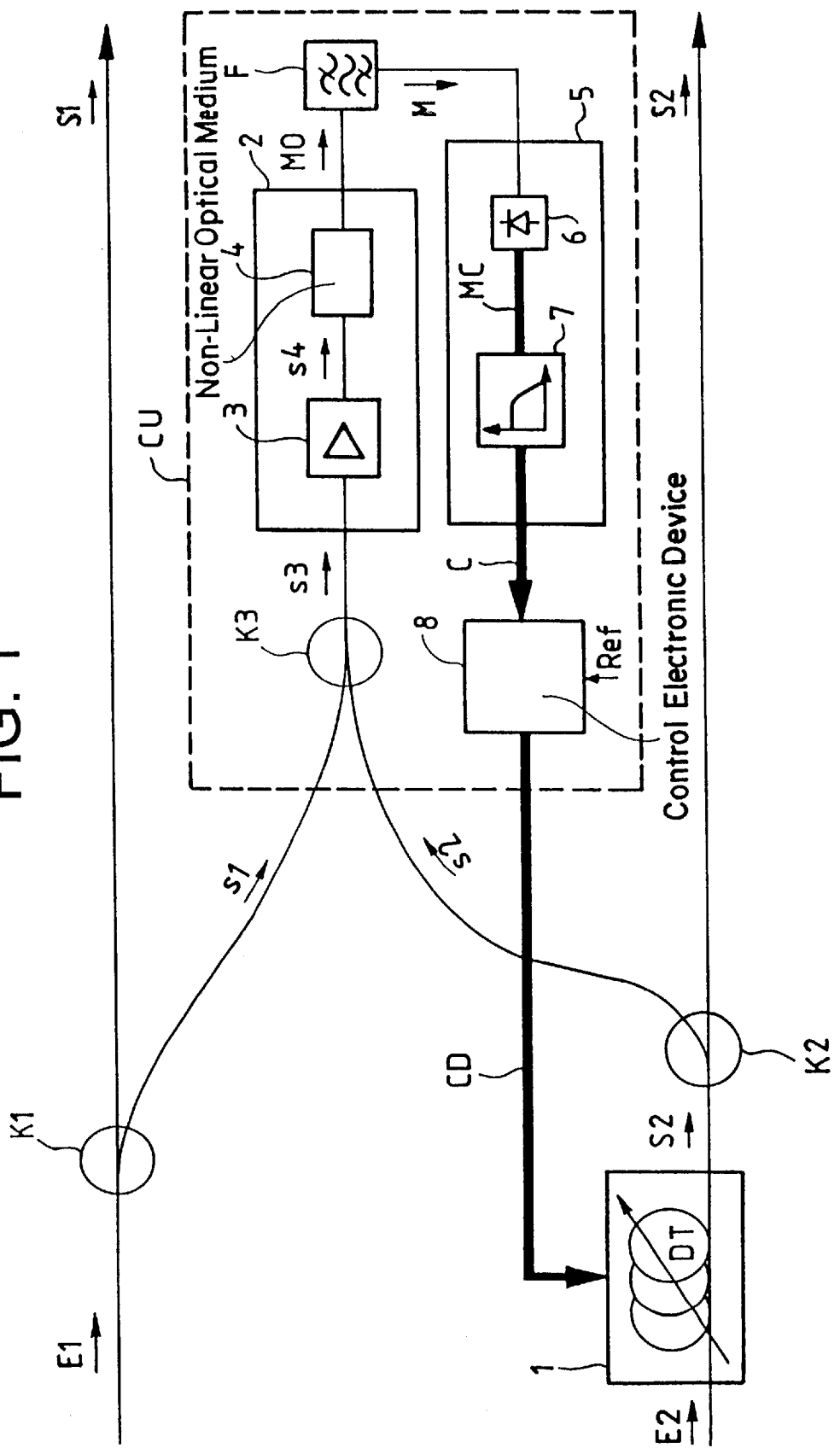
FIG. 1 shows one embodiment of the resynchronization device in accordance with the invention.

The resynchronization device shown in FIG. 1 comprises a variable time-delay device 1, two 1:2 couplers K1, K2 and a control unit CU.

The device receives the input signals E1, E2 and supplies resynchronized output signals S1, S2. The first input signal E1 is applied to the input of the first 1:2 coupler K1 the first output of which supplies the first output signal S1 and the second output of which is connected to the control unit CU and supplies a first measurement optical signal s1. The second input signal E2 is applied to the input of the second coupler K2 by the time-delay device 1. A first output of the coupler K2 supplies the second output signal S2 and its second output supplies a second measurement optical signal s2 which is fed to the input of the control unit CU.

The control unit CU includes a 2:1 coupler K3 respective inputs of which receive the first and second measurement optical signals s1, s2. The output of the coupler K3 supplies a combination signal s3 which is injected into a non-linear optical device 2. The device 2 supplies a mixed signal MO to an optical filter F which supplies a filtered signal M to a converter device 5. Converter device 5 supplies to a control device 8 an electrical control signal C representative of the mean value of the intensity of the filtered signal M. In response to the signal C the control device 8 supplies an electrical control signal CD for the variable time-delay device 1.

In the example shown, the non-linear optical device 2 comprises a fibre optical amplifier 3 connected to a non-linear optical medium 4. As the measurement signals s1 and s2 obtained from the input signals E1 and E2 have relatively low optical powers, the function of the amplifier 3 is to inject into the non-linear medium 4 sufficient optical power to cause the required intermodulation phenomena. The most appropriate non-linear medium 4 is typically a semiconductor optical amplifier for which an optical input power in the order of one milliwatt can suffice. Other media having non-linearities due to the Kerr effect could be used, however, for example optical fibres.

It is preferable for the measurement optical signals s1, s2 to have the same polarization. If the signals as received have different polarizations a polarization controller of a type known per se (not shown) could be provided on the input side of the device.

The converter device 5 comprises a photodetector 6, for example a photodiode, followed by an electrical low-pass filter 7.

The device from FIG. 1 operates in the following manner. The first input optical signal E1 is received by the first coupler K1 which samples a portion s1 of the power of that signal. The portion s1 is guided to one input of the 2:1 coupler K3. The second input signal E2 posses through the time-delay device 1 to constitute a delayed signal S2 that is fed into the input of the second 1:2 coupler K2. The coupler K2 samples a portion s2 of the power of the signal S2 and the portion s2 is guided to another input of the coupler K3. The coupler K3 then supplies a signal s3 combining the signals s1 and s2. The combination signal s3 is amplified by the amplifier 3 to supply an amplified combination signal s4 to the non-linear medium 4.

Assuming that the carriers of the input signals E1 and E2 have different optical frequencies f1 and f2, the non-linear medium 4 supplies a mixed signal MO containing intermodulation signals at optical frequencies in the form p.f1+q.f2 where p and q are relative integers (and such that the expression is positive). Each intermodulation signal has an intensity modulation that depends on the intensity modulations of the input signals and on the phase difference between their respective modulation clocks. The mixed signal MO then passes through the filter F which is chosen to transmit a band of optical frequencies centered on only one of the intermodulation frequencies f3 and different from f1 and f2. The filtered F supplies the filtered signal M which therefore represents only one of the intermodulation signals.

The photodetector 6 receives the filtered signal M and supplies a detection electrical signal MC to the electrical low-pass filter 7. The low-pass filter 7 supplies the control electrical signal C that measures the average optical intensity of the filtered signal M and consequently represents the difference between the phases of the modulation clocks of the signals E1 and S2. The signal C can then be processed by a conventional type control electronic device 8 designed to control the time-delay device 1 in accordance with the signal C to impose a phase shift set by a set point Ref.

The considerations determining the choice of the values of p and q that define the filter F are as follows. The necessary condition is that the frequency f3 be different from f1 and from f2, but it is also desirable for the frequency f3 to be in the same frequency range as f1 and f2 so that a conventional filter F and a conventional photodetector 6 can be used. Given that the difference between f1 and f2 is in practice very small compared to f1 or f2, f3 will be close to f1 and f2 if the following condition is satisfied: p+q=1, with low absolute values of p and q.

It is also necessary to allow for the properties of the non-linear medium used by choosing p and q so that the power of the corresponding intermodulation signal is as high as possible. Thus if the non-linear medium is a semiconductor optical amplifier the highest power is obtained for p=2 and q=−1 or for q=2 and p=−1.

Another aspect concerns the filtering function implemented by the converter device 5 to constitute a device for measuring the average value of the optical intensity of the filtered signal M. The time constant of the converter device 5 must be sufficient for measuring this average value. In each particular case it can be evaluated experimentally or by simulation. For example, for the usual situations of optical transmission a time constant in the order of the time interval corresponding to transmitting a few thousand bits of the input signal could be chosen.

In practice, the photodetector 6 may already have a low-pass filter function, complemented if necessary by an additional electrical low-pass filter 7, as shown in the FIG. 1 example.

FIGS. 2 and 3 show examples of the relationship between the time difference ΔT between two successive clock edges of the signals E1 and E2 and the signal C supplied by the device 5.

The FIG. 2 curve shows the level of the control electrical signal C when expressed as a percentage as a function of ΔT when the signals E1 and E2 have a very high extinction rate. FIG. 3 shows a similar curve for an extinction rate TE of 13 dB. The curves show that the signal C has a maximum value when the time difference ΔT is nil and a minimum value when the value of ΔT is half the bit time interval T of the signals E1 and E2.

Accordingly, for each particular situation, simulations are used to establish the law for the variation of C as a function of ΔT, for example. This law therefore establishes relative to ΔT the transfer function of the combination of the devices 2 and 5 in cascade. It is then a simple matter to design a control circuit 8 adapted to control the time-delay device 1 to impose a particular value of the time difference ΔT (to the nearest T).

However, to avoid the influence of the extinction rate TE on the low of the variation in C it would be beneficial to design a control device 8 that slaved C to its maximum value. If necessary, a particular difference can always be imposed between the phases of the two output signals S1 and S2 using an additional time-delay device (not shown) at the output of one of the couplers K1 or K2. In this case the control device 8 could be a circuit well known per se in the control field which superimposes on the control signal CD an overmodulation at a low frequency and adjusts the control signal CD to minimize the resulting modulation of the control signal C.

The variable time-delay device 1 can be one of the fine adjustment devices routinely employed in optical systems. For example, one such device uses a spool of optical fibre the diameter of which can be modified by a piezo-electric actuator.

FIG. 4 shows how the resynchronization device of the invention can be used to resynchronize more than two optical signals, for example signals extracted from a wavelength-division multiplex by demultiplexing.

The circuit shown is organized into a plurality of stages receiving five input signals E1–E5 (for example) and supplying five resynchronized output signals S1–S5. The first two input signals E1, E2 are resynchronized by the first stage which supplies the first output signal S2 by means of a first control unit CU1 conforming to FIG. 1 as previously described. A second stage including a second control unit CU2 resynchronizes the third signal E3 to the second output signal S2, supplying the third output signal S3. Likewise, a third control unit CU3 resynchronizes S3 and E4 and a fourth control unit CU4 resynchronizes S4 and E5. The only adaptation required compared to the FIG. 1 schematic is to provide 1:3 couplers at the output of the time-delay devices of each stage to sample each delayed signals S2–S5 for the needs of two control units.

Note that the device just described is particularly effective in the case where the modulations of the signals E1 and E2 are of the RZ or soliton type. The device can nevertheless be used for NRZ modulation if the input signals have sequences including a large number of transitions at the bit frequency. Such sequences can be sent intentionally during initialization of the system, for example.

It must also be pointed out that the device is not limited to the situation in which the clock frequencies of the input signals are the same. The device can also function if the input signals each have a clock period that is an integer multiple of a common base period. The curve representing the variations in the control signal C as a function of ΔT then has a plurality of different maximum amplitude values. This curve can nevertheless be used by appropriate control means 8.

There is claimed:

1. A method of resynchronizing optical signals in which a variable time-delay is applied to one of first and second input optical signals to supply a delayed optical signal phase-locked relative to the other of said first and second input optical signals, said first and second input optical signals conveying information by intensity modulation of optical carrier waves having different optical frequencies f1 and f2, which method comprises:

forming first and second measurement optical signals respectively representative of said delayed optical signal and said other input optical signal, forming a combination signal by coupling said first and second measurement optical signals, forming a mixed signal by injecting said combination signal into a non-linear optical device, forming a filtered signal by filtering said mixed signal using a filter tuned to an optical frequency f3 equal to p.f1+q.f2, p and q being relative integers such that the frequency f3 is different from the frequencies f1 and f2 of the carrier waves, forming a control electrical signal representative of the average value of the intensity of said filtered signal, and controlling said variable time-delay in accordance with said control signal.

2. A method as claimed in claim 1 wherein said numbers p and q are such that the difference between said frequency f3 of the filter and one of the frequencies f1 or f2 of the carrier waves is equal to the difference between said carrier wave frequencies f1 and f2.

3. A method as claimed in claim 1 wherein said first and second measurement optical signals are respectively sampled from said delayed optical signal and from said other input optical signal and in that said combination signal is amplified optically before it is injected into a non-linear optical medium.

4. A method as claimed in claim 1 wherein said electrical control signal is obtained by electrical low-pass filtering of a converted signal supplied by a photodetector to which said filtered signal is applied.

5. A device for resynchronizing optical signals including a variable time-delay device adapted to receive one of first and second input optical signals and adapted to supply a delayed optical signal phase-locked relative to the other of said first and second input optical signals, said first and second input optical signals conveying information by modulating the intensity of optical carrier waves having different optical frequencies f1 and f2, which device comprises:

sampling means for forming first and second measurement optical signals respectively representative of said delayed optical signal and said other input optical signal, coupling means adapted to receive said first and second measurement optical signals and adapted to supply a combination signal, a non-linear optical device adapted to receive said combination signal and adapted to supply a mixed signal, a filter adapted to receive said mixed signal and adapted to supply a filtered signal, said filter being tuned to an optical frequency $f3$ equal to $p.f1+q.f2$, p and q being relative integers such that the frequency $f3$ is different from the frequencies $f1$ and $f2$ of the carrier waves, a converter device for forming a control electrical signal representative of the average value of the intensity of said filtered signal, and control means for controlling said variable time-delay device in accordance with said control signal.

6. A device as claimed in claim 5 wherein said numbers p and q are such that the difference between said frequency $f3$ of the filter and one of the frequencies $f1$ or $f2$ of the carrier waves is equal to the difference between said carrier wave frequencies $f1$ and $f2$.

7. A device as claimed in claim 5 wherein said sampling means are 1:2 couplers respectively adapted to receive said delayed optical signal and said other input optical signal and respectively adapted to supply said first and second measurement optical signals and in that said non-linear optical device is an optical amplifier coupled to a non-linear optical medium, said amplifier being adapted to receive said combination signal and to supply an amplified combination signal to said non-linear optical medium.

8. A device as claimed in claim 7 wherein said non-linear optical medium is a semiconductor optical amplifier.

9. A device as claimed in claim 5 wherein said converter device is a photodetector connected to an electrical low-pass filter, said photodetector being adapted to receive said filtered signal.

10. Use of a device as claimed in claim 5 to resynchronize optical signals constituting a wavelength-division multiplex.

* * * * *